(12) United States Patent
Ishikawa et al.

(10) Patent No.: US 7,351,472 B2
(45) Date of Patent: Apr. 1, 2008

(54) WATERPROOFING AND AIRTIGHT PRESSURE-SENSITIVE ADHESIVE TAPE

(75) Inventors: Masayuki Ishikawa, Ibaraki (JP); Sadayuki Inagaki, Toyohashi (JP); Yasunori Munakata, Toyohashi (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/969,070

(22) Filed: Oct. 21, 2004

(65) Prior Publication Data

US 2005/0106387 A1    May 19, 2005

(30) Foreign Application Priority Data

Oct. 22, 2003    (JP)    .............................. 2003-361996

(51) Int. Cl.
 *B32B 7/12*    (2006.01)
(52) U.S. Cl. ........................ 428/354; 428/343; 428/351
(58) Field of Classification Search ................ 428/343, 428/351, 354, 355 R, 40.1, 356, 355 BL
 See application file for complete search history.

(56) References Cited

U.S. PATENT DOCUMENTS

| | | | | |
|---|---|---|---|---|
| 4,917,926 | A | * | 4/1990 | Weinhold et al. ........... 428/41.5 |
| 5,733,652 | A | * | 3/1998 | Stowman et al. ............ 428/343 |
| 6,001,471 | A | * | 12/1999 | Bries et al. ................. 428/343 |
| 6,569,521 | B1 | * | 5/2003 | Sheridan et al. ............ 428/343 |
| 2001/0055678 | A1 | * | 12/2001 | Murata et al. ............... 428/346 |

FOREIGN PATENT DOCUMENTS

| | | |
|---|---|---|
| EP | 0 375 862 A2 | 7/1990 |
| EP | 1 184 436 A1 | 3/2002 |
| JP | 9-209464 A | 8/1997 |
| JP | 2003-41233 A | 2/2003 |
| JP | 2003-138227 A | 5/2003 |
| WO | WO 91/15365 A1 | 10/1991 |
| WO | WO 01/81689 A2 | 11/2001 |

OTHER PUBLICATIONS

European Search Report dated Feb. 1, 2005.

\* cited by examiner

*Primary Examiner*—Elizabeth M. Cole
*Assistant Examiner*—Anish Desai
(74) *Attorney, Agent, or Firm*—Sughrue Mion, PLLC

(57) ABSTRACT

The waterproofing and airtight pressure-sensitive adhesive tape is a pressure-sensitive adhesive tape containing a substrate having a pressure-sensitive adhesive layer on one side thereof, wherein the substrate is a rubber-made sheet; a film layer having non-self-adhesive properties and adhesive properties to the pressure-sensitive adhesive layer is formed on the substrate in the side opposite to the pressure-sensitive adhesive layer; and the waterproofing and airtight pressure-sensitive adhesive tape has an elongation at break (distance between two gage marks: 40 mm, drawing rate: 300 mm/min) of from 200 to 1,200% in both the longitudinal direction and the cross direction and a stress under 100% elongation (distance between two gage marks: 40 mm, drawing rate: 50 mm/min) of from 10 to 100 N/cm$^2$ in both the longitudinal direction and the cross direction.

1 Claim, 2 Drawing Sheets

WATERPROOFING AND AIRTIGHT PRESSURE-SENSITIVE ADHESIVE TAPE

FIELD OF THE INVENTION

The present invention relates to a waterproofing and airtight pressure-sensitive adhesive tape which is used for enhancing waterproofing properties and airtightness of dwelling houses and so on. In more detail, the invention relates to a waterproofing and airtight pressure-sensitive adhesive tape which is suitably used for fixing a structure of dwelling house to a member or fixing members to each other (mainly for fixing portions where the tape is required to have elongation properties at the time of sticking, such as openings and shaped portions), or the like.

BACKGROUND OF THE INVENTION

So far, in order to cope with the enforcement of regulations regarding promotion of quality of waterproofing and airtight dwelling houses (dwelling houses having excellent waterproofing properties and airtightness) and the energy saving following high airtightness and high heat insulation of dwelling houses, waterproofing and airtight pressure-sensitive adhesive tapes have been used in gaps between a structure of dwelling house and a member or between members (mainly surroundings of sash openings or joints such as overlaps of moisture-penetrating waterproofing sheets) for the purpose of realizing waterproofing properties and airtightness (see JP-A-2003-138227, JP-A-2003-41233 and JP-A-9-209464). (The term "JP-A" as used herein means an "unexamined published Japanese patent application".) Conventional waterproofing and airtight pressure-sensitive adhesive tapes are, for example, constructed such that a butyl rubber, a rubberized asphalt, an acrylic adhesive, etc. is coated on one side of a substrate (such as non-woven fabrics, woven fabrics, and plastic films). These conventional waterproofing and airtight pressure-sensitive adhesive tapes can follow the movement of structures of dwelling houses or various members and exhibit waterproofing properties and airtightness over a long period of time.

However, in almost all cases, the conventional waterproofing and airtight pressure-sensitive adhesive tapes were used in the planar portions in which no elongation of pressure-sensitive adhesive tape is required, such as the horizontal plane, the vertical plane, or a rectangular portion of member, and it was not assumed that the pressure-sensitive adhesive tape be applied in the elongated state. Accordingly, in almost all cases, the conventional waterproofing and airtight pressure-sensitive adhesive tapes usually had an elongation at break of from 20 to 70% with the exception of a part thereof. For this reason, for example, in applying a pressure-sensitive adhesive tape to openings (such as penetration portions of water feed/discharge pipes and ventilation fans) or shaped portions (mainly external angles or convexes), the plane of a structure to which the pressure-sensitive adhesive tape is stuck becomes two or three planes, and conventional waterproofing and airtight pressure-sensitive adhesive tapes are hardly applied. Even though the application could be achieved, peeling or wrinkle is generated in the sticking portion of the pressure-sensitive adhesive tape. For this reason, a problem that the waterproofing properties and airtightness cannot be kept is generated.

Also, according to the conventional application method, as a method of realizing waterproofing properties and airtightness of openings or shaped portions, there are employed a method of using plastic moldings, a method of overlapping waterproofing and airtight pressure-sensitive adhesive tapes having been cut into a proper length, and a method of using a tape or sheet comprising a crepe-formed substrate having a pressure-sensitive adhesive coated thereon. In these methods, for example, in the method of using moldings, moldings having a number of shapes are required, and the application requires time and labor such that in installation, fixing is carried out using a pressure-sensitive adhesive tape. On the other hand, in the method of overlapping pressure-sensitive adhesive tapes and the method of using a pressure-sensitive adhesive tape using a crepe-formed substrate, in many cases the surface of the pressure-sensitive adhesive tape (surface of the substrate) is rough or irregular. Thus, a waterway is liable to be generated in overlaps of pressure-sensitive adhesive tapes because of a lowering of the adhesive strength by a reduction of the adhesive surface. Also, use of a sealing material, etc. becomes necessary for the purpose of sufficient adhesion under pressure or assistance of waterproof, if desired. In this way, it is the actual situation that sufficient waterproof properties and airtightness are hardly obtained and that the application requires time and labor.

Further, as other methods, there is employed a method of filling or coating a material in the clay or rubber sheet form, or a butyl based or silicone based sealing material. However, though the material in the clay or rubber sheet form or the sealing material before curing is suitable for filling a narrow gap, such materials are likely damaged because their strength is low. Also, these materials hardly follow excessive movement of the structure or members so that they are neither suitable for filling or coating to be employed in broad portions nor satisfactory.

SUMMARY OF THE INVENTION

Accordingly, an object of the invention is to provide a waterproofing and airtight pressure-sensitive adhesive tape which, even in the case where the pressure-sensitive adhesive tape is applied to a portion where it is required to have elongation properties, can exhibit excellent waterproofing properties and airtightness over a long period of time while preventing the generation of wrinkle, cutting or peeling.

Another object of the invention is to provide a waterproofing and airtight pressure-sensitive adhesive tape which, even when a site to which the pressure-sensitive adhesive tape is stuck has a curved shape or a three-dimensional shape, is easy in a sticking application work of pressure-sensitive adhesive tapes and good in adhesion of overlaps of pressure-sensitive adhesive tapes after application and can exhibit excellent waterproofing properties and airtightness over a long period of time.

A further object of the invention is to provide a waterproofing and airtight pressure-sensitive adhesive tape useful as a pressure-sensitive adhesive tape which can be used in fixing a structure of dwelling house to a member or fixing members to each other, prevent penetration of storm sewage into the inside of a dwelling house and prevent dew condensation and corrosion in the inside of a dwelling house over a long period of time.

For the sake of achieving the foregoing objects, the present inventor made extensive and intensive investigations. As a result, it has been found that by not only forming a specified film layer on the back side of a substrate of a pressure-sensitive adhesive tape but also adjusting an elongation and a deforming stress of the pressure-sensitive adhesive tape at a specified size, respectively, even in the case of sticking to a curved shape portion or three-dimensional shape portion, a sticking application work of the pressure-sensitive adhesive tape can be easily carried out with elongation while preventing the back side of the pressure-sensitive adhesive tape from occurrence of self-adhesive properties (a phenomenon in which at the time of sticking, in the case where pressure-sensitive adhesive tapes are folded in such a manner that the back sides thereof come into contact with each other, the back sides cause adhesion and self-adhesion) and that even in an overlap in a joint or terminal of the pressure-sensitive adhesive tape after the application, the pressure-sensitive adhesive tape can keep good waterproofing properties and airtightness over a long period of time while ensuring adhesion of the pressure-sensitive adhesive tape. The invention has been completed on a basis of these findings.

Specifically, the invention is concerned with a waterproofing and airtight pressure-sensitive adhesive tape comprising a substrate having a pressure-sensitive adhesive layer on one side thereof, wherein the substrate is a rubber-made sheet; a film layer having non-self-adhesive properties and adhesive properties to the pressure-sensitive adhesive layer is formed on the substrate in the side opposite to the pressure-sensitive adhesive layer; and the waterproofing and airtight pressure-sensitive adhesive tape has an elongation at break (distance between two gage marks: 40 mm, drawing rate: 300 mm/min) of from 200 to 1,200% in both the longitudinal direction and the cross direction and a stress under 100% elongation (distance between two gage marks: 40 mm, drawing rate: 50 mm/min) of from 10 to 100 N/cm$^2$ in both the longitudinal direction and the cross direction.

The foregoing film layer having non-self-adhesive properties and adhesive properties to a pressure-sensitive adhesive layer may be formed of a film forming composition containing an acrylic polymer or a long chain alkyl based compound; and it is preferable that the foregoing acrylic polymer is an alkyl (meth)acrylate based polymer containing at least an alkyl (meth)acrylate as a monomer component.

Also, the foregoing rubber-made sheet may be constituted of a rubber composition containing a synthetic rubber as the major component; and at least one synthetic rubber selected from a butyl rubber, an ethylene-propylene rubber, and an ethylene-propylene-diene rubber can be suitably used as the foregoing synthetic rubber.

DESCRIPTION OF REFERENCE NUMERALS AND SINGS

Figure 1:
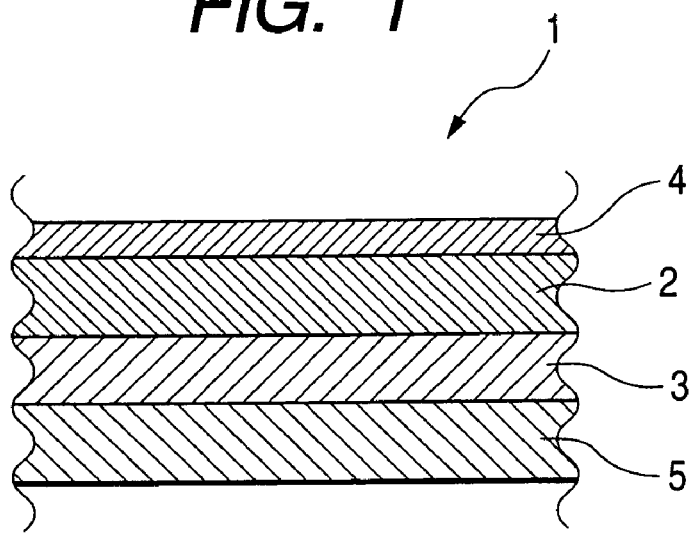
FIG. 1 is a schematic cross-sectional view to show a part of an example of the waterproofing and airtight pressure-sensitive adhesive tape of the invention.

1: Waterproofing and airtight pressure-sensitive adhesive tape
2: Rubber-made sheet
3: Pressure-sensitive adhesive layer
4: Film layer having non-self-adhesive properties and adhesive properties to a pressure-sensitive adhesive layer (non-self-adhesive and non-releasing film layer)
5: Separator
6a: One-sided specimen
6b: Other-sided specimen
7: Cylinder
7a: Water
8: Body (plywood)
9: Water feed/discharge pipe
10: Pressure-sensitive adhesive tape

DETAILED DESCRIPTION OF THE INVENTION

The waterproofing and airtight pressure-sensitive adhesive tape of the invention contains a rubber-made sheet as a substrate and has a pressure-sensitive adhesive layer on one side of the rubber-made sheet; is provided with a film layer having non-self-adhesive properties and adhesive properties to the pressure-sensitive adhesive layer (hereinafter sometimes referred to as "non-self-adhesive and non-releasing film layer") on the substrate in the side opposite to the pressure-sensitive adhesive layer; and has such characteristic features that not only its elongation at break (distance between two gage marks: 40 mm, drawing rate: 300 mm/min) is from 200 to 1,200% in both the longitudinal direction (MD direction) and the cross direction (TD direction), but also its stress under 100% elongation (distance between two gage marks: 40 mm, drawing rate: 50 mm/min) is from 10 to 100 N/cm$^2$ in both the longitudinal direction (MD direction) and the cross direction (TD direction).

In the waterproofing and airtight pressure-sensitive adhesive tape, the elongation at break (distance between two gage marks: 40 mm, drawing rate: 300 mm/min) is not particularly limited so far as it is from 200 to 1,200% in both the longitudinal direction (lengthwise or machine direction, i.e., so-called MD direction) and the cross direction (transverse direction, i.e., so-called TD direction); and the elongation at break is preferably from 300 to 1,200% (preferably from 500 to 1,200%). Incidentally, when the elongation at break is less than 200% in at least one direction of the MD direction and the TD direction, elongation properties in sticking the waterproofing and airtight pressure-sensitive adhesive tape are lowered; and on the other hand, when it exceeds 1,200%, cutting is liable to occur in elongating and sticking the waterproofing and airtight pressure-sensitive adhesive tape.

The elongation at break may be the same size or a different size in both the MD direction and the TD direction. With respect to the elongation at break, in many cases, the elongation at break in the TD direction is larger than that in the MD direction. For example, the elongation at break in the MD direction may be from 200 to 1,000% (preferably from 300 to 900%, and more preferably from 500 to 800%), whereas the elongation at break in the TD direction may be from 300 to 1,200% (preferably from 500 to 1,200%, and more preferably from 700 to 1,200%).

In the waterproofing and airtight pressure-sensitive adhesive tape, the elongation at break can be determined in such a manner that a waterproofing and airtight pressure-sensitive adhesive tape is punched into a specimen of a dumbbell shape No. 1 as defined in JIS K6251 (test width: 10 mm, distance between two gage marks: 40 mm) in each of the longitudinal direction and the cross direction of the waterproofing and airtight pressure-sensitive adhesive tape; and using a tensile tester according to JIS Z0237, the crosshead side of the specimen is drawn at a rate of 300 mm/min under conditions of a distance between two gage marks of the specimen of 40 mm and a width of the specimen (test width) of 10 mm, thereby measuring an elongation at the time when the specimen is broken.

Also, in the waterproofing and airtight pressure-sensitive adhesive tape, the stress under 100% elongation (distance between two gage marks: 40 mm, drawing rate: 50 mm/min; hereinafter sometimes referred to as "100% tensile deforming stress") is not particularly limited so far as it is from 10 to 100 N/cm$^2$ in both the longitudinal direction (lengthwise or machine direction, i.e., so-called MD direction) and the cross direction (transverse direction, i.e., so-called TD direction); and the 100% tensile deforming stress is preferably from 10 to 80 N/cm$^2$ (more preferably from 10 to 70 N/cm$^2$). Incidentally, when the 100% tensile deforming stress of the waterproofing and airtight pressure-sensitive adhesive tape is less than 10 N/cm$^2$ in at least one direction of the MD direction and the TD direction, adhesion in sticking the waterproofing and airtight pressure-sensitive adhesive tape is lowered; and on the other hand, when it exceeds 100 N/cm$^2$, the generation of wrinkle, cutting or peeling is liable to occur due to the deforming stress after elongating and sticking the waterproofing and airtight pressure-sensitive adhesive tape.

The 100% tensile deforming stress may be the same size or a different size in both the MD direction and the TD direction. With respect to the 100% tensile deforming stress, in many cases, the 100% tensile deforming stress in the MD direction is larger than that in the TD direction. For example, the 100% tensile deforming stress in the MD direction may be from 12 to 100 N/cm$^2$ (preferably from 15 to 80 N/cm$^2$, and more preferably from 20 to 70 N/cm$^2$), whereas the 100% tensile deforming stress in the TD direction may be from 10 to 80 N/cm$^2$ (preferably from 10 to 50 N/cm$^2$, and more preferably from 10 to 30 N/cm$^2$).

In the waterproofing and airtight pressure-sensitive adhesive tape, the 100% tensile deforming stress is a value calculated in such a manner that a waterproofing and airtight pressure-sensitive adhesive tape is punched into a specimen of a dumbbell shape No. 1 as defined in JIS K6251 (test width: 10 mm, distance between two gage marks: 40 mm) in each of the longitudinal direction and the cross direction of the waterproofing and airtight pressure-sensitive adhesive tape; according to JIS K6254, by using a tensile tester, the crosshead side of the specimen is drawn at a rate of 50 mm/min under conditions of a distance between two gage marks of the specimen of 40 mm and a width of the specimen (test width) of 10 mm, and when the specimen is drawn with 100%, the drawing is stopped at the time, thereby measuring a load at this time; and the measured load value is divided by a cross-sectional area of the specimen [(thickness of specimen)×(width of specimen)] before drawing.

In the waterproofing and airtight pressure-sensitive adhesive tape, the elongation at break and the 100% tensile deforming stress can be adjusted by controlling physical properties (for example, elongation at break and 100% tensile deforming stress) of the rubber-made sheet as a substrate. For example, when a rubber-made sheet having such characteristics that not only its elongation at break (distance between two gage marks: 40 mm, drawing rate: 300 mm/min) is from 200 to 1,200% in both the longitudinal direction and the cross direction, but also its stress under 100% elongation (distance between two gage marks: 40 mm, drawing rate: 50 mm/min) is from 10 to 100 N/cm$^2$ in both the longitudinal direction and the cross direction is used as the rubber-made sheet as a substrate, it is possible to prepare a waterproofing and airtight pressure-sensitive adhesive tape having the foregoing elongation at break and 100% tensile deforming stress. Incidentally, the elongation at break and 100% tensile deforming stress of the rubber-made sheet can be measured in the same manner as in the elongation at break and 100% tensile deforming stress of the waterproofing and airtight pressure-sensitive adhesive tape.

As illustrated in FIG. 1, the waterproofing and airtight pressure-sensitive adhesive tape of the invention has a construction in which a pressure-sensitive adhesive layer is formed on one side of a rubber-made sheet as a substrate, and a film layer having non-self-adhesive properties and adhesive properties to the pressure-sensitive adhesive layer (non-self-adhesive and non-releasing film layer) is formed on the other side of the rubber-made sheet (the side opposite to the pressure-sensitive adhesive layer, i.e., the back side). FIG. 1 is a schematic cross-sectional view to show a part of an example of the waterproofing and airtight pressure-sensitive adhesive tape of the invention. In FIG. 1, 1 denotes a waterproofing and airtight pressure-sensitive adhesive tape; 2 denotes a rubber-made sheet; 3 denotes a pressure-sensitive adhesive layer; 4 denotes a film layer having non-self-adhesive properties and adhesive properties to the pressure-sensitive adhesive layer (non-self-adhesive and non-releasing film layer); and 5 denotes a separator. The waterproofing and airtight pressure-sensitive adhesive tape 1 illustrated in FIG. 1 has a construction in which the pressure-sensitive adhesive layer 3 is formed on one side of the rubber-made sheet 2, the non-self-adhesive and non-releasing film layer 4 is formed on the other side of the rubber-made sheet 2, and the pressure-sensitive adhesive layer 3 is protected by the separator 5.

(Substrate)

The substrate is formed of a rubber-made sheet. The raw material or material of the rubber-made sheet is not particularly limited, and various rubber compositions (for example, rubber compositions containing a synthetic rubber or a natural rubber) can be used. It is preferable that the rubber-made sheet is constituted of a rubber composition containing a synthetic rubber as the major component. Such a synthetic rubber is not particularly limited, and examples thereof include a butyl rubber, a polyisoprene rubber, a polyisobutylene rubber, a chloroprene rubber, a nitrile butyl rubber, an ethylene-propylene rubber (EPT), an ethylene-propylene-diene rubber (EPDM), a polybutene rubber, a chlorinated polyethylene rubber, a styrene-butadiene (SB) rubber, a styrene-isoprene (SI) rubber, a styrene-isoprene-styrene block copolymer (SIS) rubber, a styrene-butadiene-styrene block copolymer (SBS) rubber, a styrene-ethylene-butylene-styrene block copolymer (SEBS) rubber, a styrene-ethylene-propylene-styrene block copolymer (SEPS) rubber, and a styrene-ethylene-propylene block copolymer (SEP) rubber. The synthetic rubber can be used singly or in combinations of two or more thereof.

A butyl rubber, an ethylene-propylene rubber, and an ethylene-propylene-diene rubber can be suitably used as the synthetic rubber. Of these, a butyl rubber is especially preferable.

Besides the rubber component (for example, a synthetic rubber), adequate additives such as a softener, a filler, a colorant, an ultraviolet absorber, an antioxidant, and an antistatic agent may be blended in proper amounts in the rubber composition.

The rubber-made sheet can be prepared by applying known forming methods (for example, an extrusion molding method and a calender molding method).

Incidentally, a rubber-made sheet made of an un-vulcanized rubber is suitable as the rubber-made sheet from the standpoint that the physical properties (for example, elongation at break and 100% tensile deforming stress) of the pressure-sensitive adhesive tape fall within the foregoing respective ranges.

The thickness of the rubber-made sheet as a substrate is not particularly limited and for example, can be selected within the range of 0.1 mm or more (for example, from 0.1 to 3.0 mm), and preferably from 0.4 to 2.0 mm (more preferably from 0.5 to 1.5 mm). When the thickness of the rubber-made sheet is too thin, the resulting pressure-sensitive adhesive tape becomes weak against an impact; and on the other hand, when it is too thick, a force necessary for drawing the pressure-sensitive adhesive tape becomes large.

(Non-self-adhesive and Non-releasing Film Layer)

The non-self-adhesive and non-releasing film layer is a film layer having non-self-adhesive properties and adhesive properties to the pressure-sensitive adhesive layer formed on the opposite side of the substrate [adhesive properties to the pressure-sensitive adhesive layer (non-releasing properties)], and the kind of its film forming composition (raw material or material) is not particularly limited so far as it can exhibit non-self-adhesive properties and non-releasing properties. The non-self-adhesive and non-releasing film layer can be formed of, for example, a film forming composition containing an acrylic polymer or a long chain alkyl based compound, or a film forming composition containing components (for example, monomer components) to be used in preparing an acrylic polymer or a long chain alkyl based compound. The film forming composition for forming a non-self-adhesive and non-releasing film layer can be used singly or in combinations of two or more thereof.

As the foregoing acrylic polymer, alkyl (meth)acrylate based polymers containing at least an alkyl (meth)acrylate as a monomer component are suitable. Specific examples of the alkyl (meth)acrylate include $C_{1-20}$-alkyl (meth)acrylates such as methyl (meth)acrylate, ethyl (meth)acrylate, propyl (meth)acrylate, isopropyl (meth)acrylate, n-butyl (meth) acrylate, isobutyl (meth)acrylate, sec-butyl (meth)acrylate, t-butyl (meth)acrylate, pentyl (meth)acrylate, hexyl (meth) acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth) acrylate, nonadecyl (meth)acrylate, and eucosyl (meth)acrylate. The alkyl (meth)acrylate as a monomer component can be used singly or in combinations of two or more thereof.

Also, in the acrylic polymer, a monomer component having copolymerization properties against the alkyl (meth) acrylate (copolymerizable monomer component) may be used along with the alkyl (meth)acrylate as monomer components. Examples of such a copolymerizable monomer component include carboxyl group-containing monomers such as (meth)acrylic acid (for example, acrylic acid and methacrylic acid), itaconic acid, maleic acid, fumaric acid, crotonic acid, and isocrotonic acid, and anhydrides thereof (for example, maleic anhydride and itaconic anhydride); maleic (mono- or di)esters such as monomethyl maleate, monoethyl maleate, and diethyl maleate; fumaric (mono- or di)esters such as monomethyl fumarate and monoethyl fumarate; aromatic vinyl compounds such as styrene and substituted styrenes; hydroxyl group-containing monomers such as hydroxyalkyl (meth)acrylates (for example, hydroxyethyl (meth)acrylate and hydroxypropyl (meth) acrylate) and glycerin dimethacrylate; epoxy group-containing monomers such as glycidyl (meth)acrylate and methylglycidyl (meth)acrylate; cyano group-containing monomers such as acrylonitrile and methacrylonitrile; amide group-containing monomers such as acrylamide, methacrylamide, N-vinylpyrrolidone, and N,N-dimethyl (meth)acrylamide; amino group-containing monomers such as aminoethyl (meth)acrylate and (meth)acryloyl morpholine; imido group-containing monomers such as cyclohexyl maleimide and isopropyl maleimide; vinyl esters such as vinyl acetate; vinyl alcohols such as vinyl alcohol; vinyl ethers such as vinyl alkyl ethers; vinyl chloride; olefins such as ethylene and propylene; dienes such as butadiene, isoprene, and isobutylene; and sulfonic group-containing monomers such as sodium vinylsulfonate. The copolymerizable monomer component can be used singly or in combinations of two or more thereof.

Concretely, polybutyl methacrylate and an octadecyl methacrylate-acrylonitrile copolymer are suitable as the acrylic polymer.

On the other hand, the long chain alkyl based compound is not particularly limited, and for example, reaction products between polyvinyl alcohol and a long chain alkylene isocyanate having from 10 to 20 carbon atoms such as stearyl isocyanate can be used.

In general, materials that are used as a releasing agent are included in the material to be used in the non-self-adhesive and non-releasing film layer. However, in the invention, by properly selecting a combination with a pressure-sensitive adhesive (for example, a butyl rubber based pressure-sensitive adhesive exhibits adhesive properties to a film layer made of an octadecyl methacrylate-acrylonitrile copolymer), or by making the coating amount thin, thereby generating a crack in a film layer in drawing a pressure-sensitive adhesive tape at the time of sticking to reveal adhesive properties to the pressure-sensitive adhesive layer, it is possible to apply a film layer made of a general releasing agent as the non-self-adhesive and non-releasing film layer.

Incidentally, what the foregoing film layer has adhesive properties to the pressure-sensitive adhesive layer formed on the opposite side of the substrate means that, for example, with respect to two specimens prepared from the same pressure-sensitive adhesive tape, in the case where a pressure-sensitive adhesive layer of one of the specimens is stuck onto the back side of a substrate of the other specimen (the film layer side) by reciprocating a 2-kg roll one time, and after elapsing for 30 minutes, a 180°-peel adhesive strength (width of specimen: 25 mm, drawing rate: 300 mm/min, temperature: 23±2° C., humidity: 50±5% RH) is measured, the 180°-peel adhesive strength is 3 N/25 mm or more (preferably 5 N/25 mm or more).

In the non-self-adhesive and non-releasing film layer, besides the acrylic polymer or long chain alkyl based compound, or the components for preparing an acrylic polymer or a long chain alkyl based compound (for example, monomer components), adequate additives such as a filler, a colorant, an ultraviolet absorber, an antioxidant, and an antistatic agent may be blended in proper amounts in the film forming composition.

The method of forming a non-self-adhesive and non-releasing film layer is not particularly limited. For example, the non-self-adhesive and non-releasing film layer can be formed by coating the film forming composition on the back side of the substrate, followed by drying and curing, if desired. Incidentally, the foregoing film forming composition may be in the liquid state or molten state. In the case where the film forming composition is in the liquid state or molten state or contains monomer components for preparing an acrylic polymer, the non-self-adhesive and non-releasing film layer can be formed by drying and curing upon heating of the film forming composition after coating.

The thickness of the non-self-adhesive and non-releasing film layer is not particularly limited and for example, can be selected within the range of 0.5 to 10 µm, preferably from 1 to 5 µm, and about 3 µm in average.

(Pressure-sensitive Adhesive Layer)

The pressure-sensitive adhesive that constitutes the pressure-sensitive adhesive layer is not particularly limited, and examples thereof include known pressure-sensitive adhesives such as rubber based pressure-sensitive adhesives, acrylic pressure-sensitive adhesives, polyester based pressure-sensitive adhesives, urethane based pressure-sensitive adhesives, polyamide based pressure-sensitive adhesives, epoxy based pressure-sensitive adhesives, vinyl alkyl ether based pressure-sensitive adhesives, silicone based pressure-sensitive adhesives, and fluorine based pressure-sensitive adhesives. Also, the pressure-sensitive adhesive may be a hot melt type pressure-sensitive adhesive. The pressure-sensitive adhesive can be used singly or in combinations of two or more thereof. The pressure-sensitive adhesive may be in the form of any pressure-sensitive adhesive such as an emulsion based pressure-sensitive adhesive, a solvent based pressure-sensitive adhesive, an oligomer based pressure-sensitive adhesive, and a solid pressure-sensitive adhesive.

Incidentally, the pressure-sensitive adhesive may contain proper additives such as a crosslinking agent (for example, a polyisocyanate based crosslinking agent and an alkyl etherified melamine compound based crosslinking agent), a tackifier (for example, a rosin derivative resin, a polyterpene resin, a petroleum resin, and a phenol resin), a plasticizer, a filler, and an anti-aging agent in addition to the polymer component such as the pressure-sensitive adhesive component (base polymer) depending upon the kind of the pressure-sensitive adhesive, etc.

A rubber based pressure-sensitive adhesive is suitable as the pressure-sensitive adhesive. For example, the rubber based pressure-sensitive adhesive may be any of a natural rubber based pressure-sensitive adhesive containing a natural rubber as the base polymer or a synthetic rubber based pressure-sensitive adhesive containing a synthetic rubber as the base polymer. Of these, a synthetic rubber based pressure-sensitive adhesive is preferable. Examples of synthetic rubbers in such a synthetic rubber pressure-sensitive adhesive include a butyl rubber, a polyisoprene rubber, a polyisobutylene rubber, a styrene-butadiene (SB) rubber, a styrene-isoprene (SI) rubber, a styrene-isoprene-styrene block copolymer (SIS) rubber, a styrene-butadiene-styrene block copolymer (SBS) rubber, a styrene-ethylene-butylene-styrene block copolymer (SEBS) rubber, a styrene-ethylene-propylene-styrene block copolymer (SEPS) rubber, a styrene-ethylene-propylene block copolymer (SEP) rubber, a regenerated rubber, and modified materials thereof. Of these, a butyl rubber is especially preferable. That is, a butyl rubber based pressure-sensitive adhesive is optimum as the pressure-sensitive adhesive.

As the method of forming a pressure-sensitive adhesive layer, known or customary forming methods can be employed, and a method of molding a pressure-sensitive adhesive into a sheet-like form by an extruder or a calender roll and sticking it onto a rubber-made sheet can be employed. Also, a method of coating a pressure-sensitive adhesive on the surface of a rubber-made sheet as the substrate (coating method) and a method of coating a pressure-sensitive adhesive on a release film such as a release liner to form a pressure-sensitive adhesive layer and then transferring the pressure-sensitive adhesive layer onto a rubber-made sheet as the substrate (a transfer method) can be employed.

The thickness of the pressure-sensitive adhesive layer is not particularly limited and for example, can be selected within the range of from 0.1 to 3 mm (preferably from 0.2 to 2 mm, and more preferably from 0.3 to 1 mm).

(Separator)

In the waterproofing and airtight pressure-sensitive adhesive tape 1 illustrated in FIG. 1, the pressure-sensitive adhesive layer 3 is protected by the separator 5. The separator 5 is used as the need arises and therefore, can be arbitrarily provided. The separator (release liner) is not particularly limited, and known separators can be properly selected and used.

In this way, the waterproofing and airtight pressure-sensitive adhesive tape has the pressure-sensitive adhesive layer on one side of the rubber-made sheet and the non-self-adhesive and non-releasing film layer on the other side of the rubber-made sheet. For example, the waterproofing and airtight pressure-sensitive adhesive tape can be prepared by blending a rubber component such as a synthetic rubber with proper amounts of additives such as a softener and a filler; mixing the blend by a mixer such as a mixing roll, a kneader, and a Banbury mixer to prepare a rubber composition; molding the rubber composition into a sheet-like form using a calender roll, an extruder, etc. to prepare a rubber-made sheet; coating a film forming composition on a prescribed side (side which will become the back side against a pressure-sensitive adhesive layer) of the rubber-made sheet by using a metal roll or in a casting method and drying it to form a non-self-adhesive and non-releasing film layer; attaching a pressure-sensitive adhesive layer in the sheet-like form obtained by extrusion molding using an extruder or molding using a calender roll onto the other side (side which will become an adhesive side) of the rubber-made sheet; and further superimposing a separator in which one side or both sides thereof become a release treated side on the surface of the pressure-sensitive adhesive layer and winding up the assembly.

Incidentally, in the case where the non-self-adhesive and non-releasing film layer is formed of polybutyl methacrylate, for example, the non-self-adhesive and non-releasing film layer can be formed by coating a solution of polybutyl methacrylate obtained by dissolving polybutyl methacrylate in a solvent such as xylene on the back side of a substrate, followed by drying.

Also, in the case where the pressure-sensitive adhesive layer is a pressure-sensitive adhesive layer made of a rubber based pressure-sensitive adhesive, for example, the pressure-sensitive adhesive layer in the sheet-like form can be formed by adding proper amounts of additives such as a softener, a filler, and a tackifier to a rubber component such as a butyl rubber and mixing them in a mixer (for example, a mixing roll and a kneader) to prepare a rubber based pressure-sensitive adhesive (in particular, a butyl rubber based pressure-sensitive adhesive) and molding the rubber based pressure-sensitive adhesive using an extruder or a calender roll. As a matter of course, as described previously, the pressure-sensitive adhesive layer can be formed by coating a pressure-sensitive adhesive composition in the solution state or molten state on the prescribed surface of a rubber-made sheet, or by coating it on a release film and then transferring it onto the prescribed side of a rubber-made sheet.

Moreover, it is important to use, as the rubber-made sheet, a rubber-made sheet having physical properties (for example, elongation at break and 100% tensile deforming stress) so as to enable the elongation at break and 100% tensile deforming stress of the waterproofing and airtight pressure-sensitive adhesive tape to fall within the foregoing respective ranges.

As described previously, in the waterproofing and airtight pressure-sensitive adhesive tape of the invention, the non-self-adhesive and non-releasing film layer having non-adhesive properties and adhesive properties to the pressure-sensitive adhesive layer (non-releasing properties) is formed on the back side of the substrate. Accordingly, for example, when the pressure-sensitive adhesive tape is stuck, even in the case where the waterproofing and airtight pressure-sensitive adhesive tape of the invention is folded in such a manner that the back sides of the substrates come into contact with each other, adhesion of the back sides to each other or self adhesion thereof is prevented. Also, even when the surface of the substrate is irregular, not only the back side of the substrate becomes a smooth plane by the non-self-adhesive and non-releasing film layer, but also it becomes a plane to which the pressure-sensitive adhesive layer can adhere. Accordingly, the pressure-sensitive adhesive layer can adhere well to the non-self-adhesive and non-releasing film layer. Moreover, since the elongation at break and the 100% tensile deforming stress become proper sizes, not only it is possible to stick the waterproofing and airtight pressure-sensitive adhesive tape by properly drawing it, but also even when the waterproofing and airtight pressure-sensitive adhesive tape is stuck in the elongated state, it is possible to effectively keep that state over a long period of time.

Accordingly, even in the case where the waterproofing and airtight pressure-sensitive adhesive tape is stuck to a curved shape or a three-dimensional shape such as openings and shaped portions (for example, external angles or convexes), since the waterproofing and airtight pressure-sensitive adhesive tape can be folded in the sate that the back sides come into contact with each other or can be stuck while properly drawing, it can be easily stuck. Also, even when the waterproofing and airtight pressure-sensitive adhesive tape is stuck in the drawn and elongated state, the generation of wrinkle, cutting or peeling due to a deforming stress is prevented so that the elongated state can be effectively kept. Further, even when the pressure-sensitive adhesive layer of the pressure-sensitive adhesive tape is superimposed on the back side of the substrate and stuck thereto, it can be stuck with excellent adhesion properties. Also, in an overlap of a joint of the pressure-sensitive adhesive tape after sticking or an overlap of a terminal, adhesive properties of the pressure-sensitive adhesive tape can be ensured. For this reason, when the waterproofing and airtight pressure-sensitive adhesive tape of the invention is used, even if the sticking site has a curved shape or a three-dimensional shape, the sticking work can be carried out simply. For example, the waterproofing and airtight pressure-sensitive adhesive tape of the invention can be stuck beautifully in a cylindrical or fan form. Moreover, after sticking, it is possible to exhibit excellent waterproofing properties and airtightness over a long period of time.

In this way, since the waterproofing and airtight pressure-sensitive adhesive tape of the invention can be stuck in the state having excellent waterproofing properties and airtightness, it can be suitably used as a pressure-sensitive adhesive tape having waterproofing properties and/or airtightness depending upon the application. In particular, since not only the waterproofing and airtight pressure-sensitive adhesive tape of the invention can be stuck in the state having excellent waterproofing properties and airtightness, but also its sticking application work of the pressure-sensitive adhesive tape is easy, the waterproofing and airtight pressure-sensitive adhesive tape of the invention can be utilized as a waterproofing and airtight pressure-sensitive adhesive tape which is used for fixing a structure of dwelling house to a member or fixing members to each other. For example, it is useful as a waterproofing and airtight pressure-sensitive adhesive tape to be used in fixing of openings such as ventilating openings of external wall penetration portions of exterior backings, surroundings of conduits, penetration portions of water feed/discharge pipes, ventilation fans, and surroundings of sash openings (for example, surroundings of arch type or cylindrical sash openings); shaped portions such as external angles, internal angles, and convexes (in particular, not only a site in which the sticking portion is planar but also a site in which the sticking portion has a curved shape or a three-dimensional shape), and so on. Accordingly, by using the waterproofing and airtight pressure-sensitive adhesive tape of the invention, it is possible to enhance waterproofing properties and airtightness of dwelling houses. Also, it is possible to prevent penetration of storm sewage into the inside of a dwelling house and to prevent dew condensation and corrosion in the inside of a dwelling house.

Incidentally, for example, in the sticking application of a pressure-sensitive adhesive tape in water feed/discharge pipes, there is a sticking application method of a waterproofing and airtight pressure-sensitive adhesive tape in a portion where a body and a feed/discharge pipe intersect at right angles each other. In this case, there is usually employed an application method in which the pressure-sensitive adhesive tape is folded in the state that it comes into contact with the back side in a ½ width (by this folding, the back sides come into contact with each other); the pressure-sensitive adhesive tape is wound up around the surrounding (circumference) of the feed/discharge pipe; and thereafter, the remaining ½-width part is stuck to the body. At this time, a rubber-made sheet made of a general unvulcanized rubber involved a problem that in folding in a ½ width, the back sides of the rubber-made sheet are liable to adhere to each other due to tackiness of the surface of the rubber-made sheet. On the other hand, for the sake of suppressing or preventing adhesion of the back sides of a rubber-made sheet to each other, if a silicone based releasing agent was coated, there was encountered a problem that in sticking, in the case where the pressure-sensitive adhesive tape was superimposed and stuck on the back sides (own back sides) of the rubber-made sheet, adhesive properties are lost so that airtightness cannot be ensured in that portion. However, when the waterproofing and airtight pressure-sensitive adhesive tape of the invention is used, by providing a film layer having a specified formulation (namely, a non-self-adhesive and non-releasing film layer) on the rear surface (back side) of a rubber-made sheet, it is possible to design to cope with both prevention of adhesion of the back sides to each other and revealment of adhesion properties of a pressure-sensitive adhesive layer.

According to the waterproofing and airtight pressure-sensitive adhesive tape of the invention, even in the case where the pressure-sensitive adhesive tape is applied to a portion where it is required to have elongation properties, excellent waterproofing properties and airtightness can be exhibited over a long period of time while preventing the generation of wrinkle, cutting or peeling. Also, even when a site to which the pressure-sensitive adhesive tape is stuck has a curved shape or a three-dimensional shape, the waterproofing and airtight pressure-sensitive adhesive tape of the invention is easy in a sticking application work of pressure-sensitive adhesive tapes and good in adhesion of overlaps of pressure-sensitive adhesive tapes after the application and can exhibit excellent waterproofing properties and airtightness over a long period of time. For this reason, the waterproofing and airtight pressure-sensitive adhesive tape of the invention is useful as a pressure-sensitive adhesive tape which can be used in fixing a structure of dwelling house to a member or fixing members to each other, prevent penetration of storm sewage into the inside of a dwelling house and prevent dew condensation and corrosion in the inside of a dwelling house over a long period of time.

The invention will be described below in more detail with reference to the following Examples, but it should not be construed that the invention is limited thereto.

Preparation Example 1 of Substrate 50 parts by weight of a butyl rubber, 50 parts by weight of an ethylene-propylene-diene rubber (EPDM), 120 parts by weight of calcium carbonate heavy, 15 parts by weight of a process oil, and 10 parts by weight of carbon black were thrown into a mixer (Banbury mixer) and kneaded for 8 minutes. The kneaded mixture was then molded into a sheet-like form using a calender roll under a condition at a roll temperature of 110° C. There were thus prepared rubber-made sheets having a varied thickness (a rubber-made sheet having a thickness of 0.45 mm, a rubber-made sheet having a thickness of 0.55 mm, and a rubber-made sheet having a thickness of 2.0 mm).

Preparation Example 2 of Substrate 100 parts by weight of a butyl rubber, 70 parts by weight of calcium carbonate heavy, 90 parts by weight of a clay, 50 parts by weight of a process oil, 65 parts by weight of carbon black, 60 parts by weight of an asphalt, and 90 parts by weight of polyethylene were thrown into a mixer (Banbury mixer) and kneaded for 8 minutes. The kneaded mixture was then molded into a sheet-like form using a calender roll under a condition at a roll temperature of 120° C. There was thus prepared an unvulcanized rubber-made sheet having a thickness of 0.6 mm.

Preparation Example 3 of Substrate 100 parts by weight of a butyl rubber, 4.5 parts by weight of a vulcanizer (sulfur based vulcanizer), 140 parts by weight of an ethylene-propylene rubber (EPT), 250 parts by weight of carbon black, 25 parts by weight of an asphalt, 40 parts by weight of a process oil, and 100 parts by weight of calcium carbonate heavy were thrown into a mixer (Banbury mixer) and kneaded for 8 minutes. Thereafter, the kneaded mixture was molded into a sheet-like form using a calender roll under a condition at a roll temperature of 95° C. and then vulcanized at a vulcanization temperature of 140° C. There was thus prepared a vulcanized rubber-made sheet having a thickness of 0.7 mm.

Preparation Example 4 of Substrate

Polyethylene was molded into a sheet-like form using an extruder at a die temperature of 200° C. There was thus prepared a polyethylene-made sheet having a thickness of 0.025 mm.

Preparation Example 1 of Film Forming Composition

Acrylonitrile and octadecyl methacrylate were polymerized in a toluene solution to obtain a copolymer [acrylonitrile/octadecyl methacrylate (weight molar ratio)=30/70, weight average molecular weight: 40,000]. This copolymer was subjected to concentration adjustment with toluene to prepare a solution having a solids content of 1% by weight. This solution was designated as a film forming composition.

Preparation Example 1 of Pressure-sensitive Adhesive Layer

A mixture of 100 parts by weight of a butyl rubber, 50 parts by weight of a tackifier, 100 parts by weight of calcium carbonate heavy, 30 parts by weight of carbon black, and 100 parts by weight of a softener was introduced into an extruder and extrusion molded to prepare a pressure-sensitive adhesive layer in the sheet-like form having a thickness of 1.0 mm.

EXAMPLE 1

A prescribed amount of the film forming composition obtained in Preparation Example 1 of Film Forming Composition was coated on one side of the rubber-made sheet having a thickness of 0.45 mm obtained in Preparation Example 1 of Substrate and dried at 100° C. for 0.5 minutes to form a film layer having a thickness of about 3 μm. Thereafter, the pressure-sensitive adhesive layer in the sheet-like form (thickness: 1.0 mm) obtained in Preparation Example 1 of Pressure-sensitive Adhesive Layer was stuck on the other side of the rubber-made sheet (the side opposite to the film layer), and a release liner in which one side thereof had been subjected to a silicone release treatment was stuck on the pressure-sensitive adhesive layer to obtain a pressure-sensitive adhesive tape.

EXAMPLE 2

A pressure-sensitive adhesive tape was obtained in the same manner as in Example 1, except that the rubber-made sheet having a thickness of 2.0 mm obtained in Preparation Example 1 of Substrate was used as the substrate.

EXAMPLE 3

A pressure-sensitive adhesive tape was obtained in the same manner as in Example 1, except that the rubber-made sheet having a thickness of 0.55 mm obtained in Preparation Example 1 of Substrate was used as the substrate.

COMPARATIVE EXAMPLE 1

A pressure-sensitive adhesive tape was obtained in the same manner as in Example 1, except that the unvulcanized rubber-made sheet having a thickness of 0.6 mm obtained in Preparation Example 2 of Substrate was used as the substrate.

COMPARATIVE EXAMPLE 2

A pressure-sensitive adhesive tape was obtained in the same manner as in Example 1, except that the vulcanized rubber-made sheet having a thickness of 0.7 mm obtained in Preparation Example 3 of Substrate was used as the substrate.

COMPARATIVE EXAMPLE 3

A pressure-sensitive adhesive tape was obtained in the same manner as in Example 1, except that the polyethylene-made sheet having a thickness of 0.025 mm obtained in Preparation Example 4 of Substrate was used as the substrate.

(Evaluation of Adhesive Properties of Back Side)

The pressure-sensitive adhesive tape obtained in Example 1 was cut into a width of 25 mm, and adhesive properties of the back side of the substrate (the side of the film layer made of the film forming composition obtained in Preparation Example 1 of Film Forming Composition) were confirmed through finger touch. Also, the back sides (film layer sides) were stuck to each other and laminated by reciprocating a 2-kg roll one time, and after elapsing for 30 minutes, the laminate was peeled apart from each other to confirm organoleptically adhesive properties between the back sides. Moreover, in this peeling, a 180°-peel adhesive strength (width of specimen: 25 mm, drawing rate: 300 mm/min, temperature: 23±2° C., humidity: 50±5% RH) was measured. As a result, no tackiness was felt through finger touch, and in peeling after sticking the back sides to each other, the 180°-peel adhesive strength was 0 N/25 mm. Thus, it was confirmed that the back sides did not cause adhesion to each other so that the sticking application work was not hindered.

(Evaluation of Adhesive Properties to Back Side of Pressure-sensitive Adhesive Layer)

The pressure-sensitive adhesive tape obtained in Example 1 was cut into a width of 25 mm to prepare two specimens. A pressure-sensitive adhesive layer of one of the specimens was stuck onto the surface of a substrate of the other specimen (the side of a film layer made of the film forming composition obtained in Preparation Example 1 of Film Forming Composition) by reciprocating a 2-kg roll one time and allowed to stand for a prescribed period of time (30 minutes and 24 hours). A 180°-peel adhesive strength (width of specimen: 25 mm, drawing rate: 300 mm/min, temperature: 23±2° C., humidity: 50±5% RH; the specimen in the side in which the back side of the substrate was stuck to the pressure-sensitive adhesive layer was peeled) was measured using a tensile tester (a trade name of device: Autograph, manufactured by Shimadzu Corporation). As a result, the 180°-peel adhesive strength (drawing rate: 300 mm/min) 30 minutes after standing was 9 N/25 mm, and the 180°-peel adhesive strength (drawing rate: 300 mm/min) 24 hours after standing was 13 N/25 mm.

(Evaluation of Waterproofing Properties)

Figure 2:
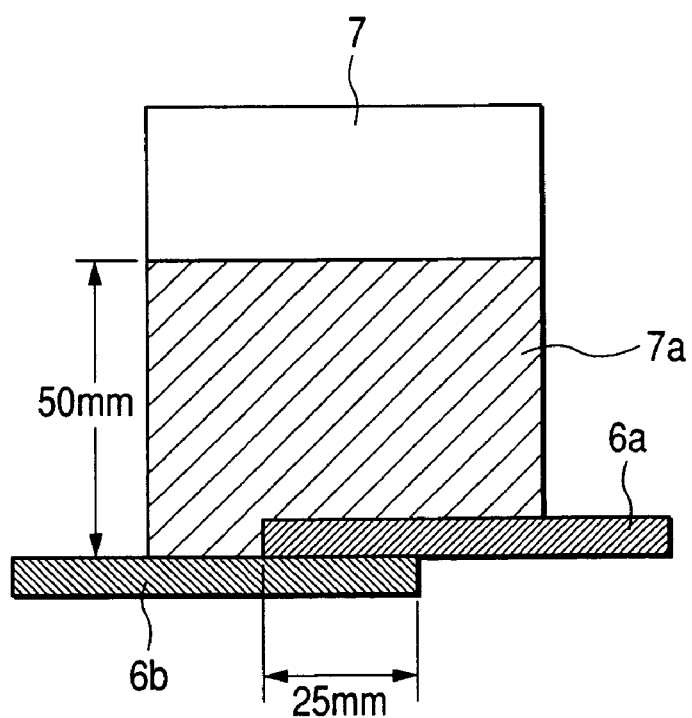
FIG. 2 is a schematic view to show a method of evaluating waterproofing properties in the evaluation of waterproofing properties in the Examples.

The pressure-sensitive adhesive tape obtained in Example 1 was cut into a width of 100 mm to prepare two specimens. A pressure-sensitive adhesive layer of one of the specimens was superimposed on the surface of a substrate of the other specimen (the side of a film layer made of the film forming composition obtained in Preparation Example 1 of Film Forming Composition) in a length of 25 mm as illustrated in FIG. 2 and stuck by reciprocating a 2-kg roll one time. Thereafter, a cylinder having a diameter of 70 mm was stood on the overlap, and a boundary thereof with the pressure-sensitive adhesive tape was subjected to a leak-prevention treatment with a sealing material. Thereafter, water was poured in the cylinder in a height of 50 mm, and after elapsing for 24 hours, the presence or absence of water leakage in the overlap was visually observed. As a result, the water leakage was not found so that waterproofing properties and airtightness were confirmed to be good.

FIG. 2 is a schematic view to show a method of evaluating waterproofing properties in the evaluation of waterproofing properties in the Examples. In FIG. 2, 6a denotes a one-sided specimen (width: 100 mm); 6b denotes the other-sided specimen (width: 100 mm); 7 denotes a cylinder (external diameter: 70 mm, made of a plastic); and 7a denotes water. In FIG. 2, a pressure-sensitive adhesive layer in the one-sided specimen 6a is superimposed and adhered onto the surface of a substrate in the other-sided specimen 6b in an overlap length of 25 mm; the cylinder 7 is stood on the overlap; a boundary between the cylinder 7 and the specimens (6a, 6b) is subjected to a leak-prevention treatment with a sealing material; and water is then poured in the cylinder 7 in a height of 50 mm.

Accordingly, it was confirmed that the pressure-sensitive adhesive tape obtained in Example 1 has good adhesive properties to the back side of the pressure-sensitive adhesive layer (surface of the film layer) and excellent waterproofing properties.

Moreover, the pressure-sensitive adhesive tapes obtained in Examples 1 to 3 and Comparative Examples 1 to 3 were evaluated with respect to elongation at break, stress under 100% elongation and sticking application properties by a method of measuring an elongation at break, a method of measuring a stress under 100% elongation and a method of evaluating sticking application properties as described below.

(Method of Measuring an Elongation at Break)

Each of the pressure-sensitive adhesive tapes obtained in Examples 1 to 3 and Comparative Examples 1 to 3 is punched into a specimen of a dumbbell shape No. 1 as defined in JIS K6251 (test width: 10 mm, distance between two gage marks: 40 mm) in each of the longitudinal direction (MD direction) and the cross direction (TD direction) of the specimen; and using a tensile tester, the crosshead side of the specimen is drawn at a rate of 300 mm/min under conditions of a distance between two gage marks of the specimen of 40 mm and a width of the specimen of 10 mm, thereby measuring an elongation (%) at the time when the specimen is broken. Incidentally, the elongation values in the MD direction side are shown in the "MD direction" row in the "Elongation (%) at break" of Table 1; and the elongation values in the TD direction side are shown in the "TD direction" row in the "Elongation (%) at break" of Table 1.

(Method of Measuring a Stress Under 100% Elongation)

Each of the pressure-sensitive adhesive tapes obtained in Examples 1 to 3 and Comparative Examples 1 to 3 is punched into a specimen of a dumbbell shape No. 1 as defined in JIS K6251 (test width: 10 mm, distance between two gage marks: 40 mm) in each of the longitudinal direction (MD direction) and the cross direction (TD direction) of the specimen; according to JIS K6254, by using a tensile tester, the crosshead side of the specimen is drawn at a rate of 50 mm/min under conditions of a distance between two gage marks of the specimen of 40 mm and a width of the specimen of 10 mm, and when the specimen is drawn with 100%, the drawing is stopped at the time, thereby measuring a load (N) at this time; and the measured load value is divided by a cross-sectional area of the specimen [(thickness of specimen)×(width of specimen)] before drawing to calculate a load (N/cm$^2$) per unit cross-sectional area. This calculated value is designated as a stress under 100% elongation. Incidentally, the values stress under 100% elongation in the MD direction side are shown in the "MD direction" row in the "100% elongation deforming stress (N/cm$^2$)" of Table 1; and the values stress under 100% elongation in the TD direction side are shown in the "TD direction" row in the "100% elongation deforming stress (N/cm$^2$)" of Table 1.

(Method of Evaluating Sticking Application Properties)

Figure 3:
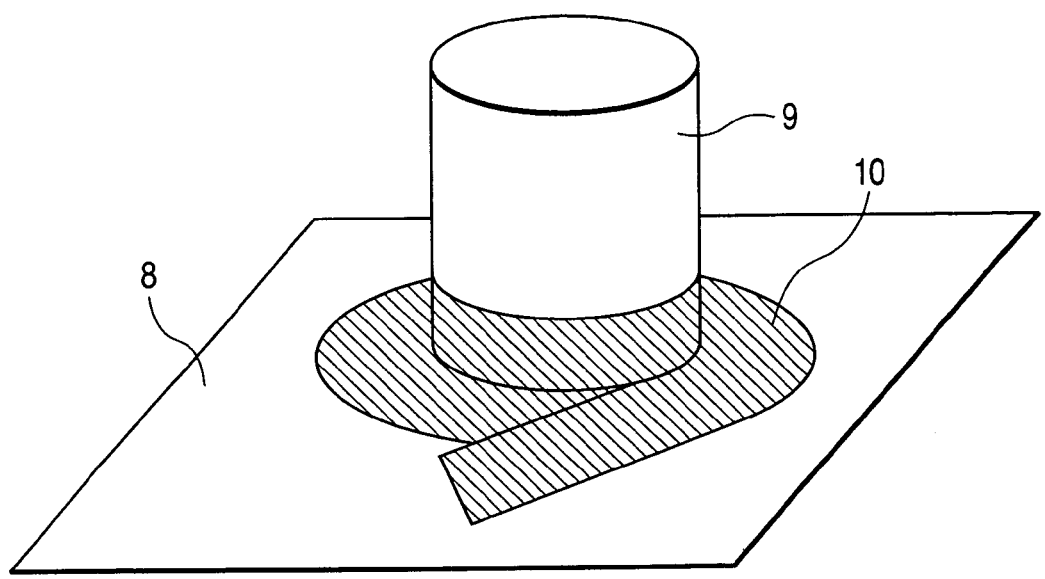
FIG. 3 is a schematic view to show a method of subjecting a pressure-sensitive adhesive tape to sticking to a circumference of a shaped portion by a method of evaluating sticking application properties in the Examples.

Each of the pressure-sensitive adhesive tapes obtained in Examples 1 to 3 and Comparative Examples 1 to 3 is cut into a width of 50 mm and a length of 250 mm to prepare a pressure-sensitive adhesive tape-stuck specimen. As illustrated in FIG. 3, the foregoing pressure-sensitive adhesive tape-stuck specimen is applied by sticking onto the circumference of a shaped portion of a water feed/discharge pipe (a cylindrical water feed/discharge pipe having an external diameter of 60 mmϕ) adhered onto the surface of a body made of a plywood in the vertically standing state against the surface of the foregoing plywood (i.e., a joint between the body and the water feed/discharge pipe and its circumference) under a condition at a temperature of 23±2° C. and at a humidity of 50±5% RPH, and after standing for 24 hours under a condition at a temperature of 23±2° C. and at a humidity of 50±5% RH, the appearance of the pressure-sensitive adhesive tape is visually observed, the presence or absence of peeling or lifting of the pressure-sensitive adhesive tape, which likely hinders waterproofing properties and airtightness, is confirmed, and sticking application properties are evaluated. Incidentally, the evaluation results are shown in the "Sticking application properties" row of Table 1.

FIG. 3 is a schematic view to show a method of subjecting a pressure-sensitive adhesive tape to sticking to a circumference of a shaped portion by a method of evaluating sticking application properties in the Examples. In FIG. 3, 8 denotes a body (plywood); 9 denotes a water feed/discharge pipe; and 10 denotes a pressure-sensitive adhesive tape. In FIG. 3, the water feed/discharge pipe 9 is adhered onto the surface of the body 8 made of a plywood in the vertically standing state against the surface of the foregoing body (plywood) 8. The foregoing water feed/discharge pipe 9 has a cylindrical shape having an external diameter of 60 mmϕ. The pressure-sensitive adhesive tape 10 is applied in such a shape portion and its circumference (a joint between the body 8 and the water feed/discharge pipe 9 and its circumference).

TABLE 1

|  | Example | | | Comparative Example | | |
|---|---|---|---|---|---|---|
|  | 1 | 2 | 3 | 1 | 2 | 3 |
| Thickness of substrate (mm) | 0.45 | 2.0 | 0.55 | 0.6 | 0.7 | 0.025 |
| Elongation at break (%) | | | | | | |
| MD direction | 690 | 610 | 780 | 400 | 600 | 900 |
| TD direction | 970 | 900 | 970 | 500 | 800 | 1000 |
| 100% tensile deforming stress (N/cm$^2$) | | | | | | |
| MD direction | 50 | 50 | 30 | 130 | 125 | 1730 |
| TD direction | 20 | 20 | 16 | 110 | 114 | 1200 |
| Sticking application properties | Peeling and/or lifting did not occur. | | | Peeling and/or lifting occurred. | | |

As is clear from the results of the respective evaluations of Table 1 and so on, it was confirmed that the pressure-sensitive adhesive tapes according to Examples 1 to 3 are easy and good in sticking application workability in sites of pressure-sensitive adhesive tape, which are required to have elongation properties at the time of sticking, such as shaped portions and openings, and can exhibit excellent waterproofing properties and airtightness after the sticking application.

While the invention has been described in detail and with reference to specific embodiments thereof, it will be apparent to one skilled in the art that various changes and modifications can be made therein without departing from the spirit and scope thereof.

What is claimed is:

1. A waterproofing and airtight pressure-sensitive adhesive tape comprising a substrate having a butyl rubber-based pressure-sensitive adhesive layer on one side thereof, wherein the substrate is a sheet made of an unvulcanized rubber containing a butyl rubber; a film layer having non-self-adhesive properties and adhesive properties to the pressure-sensitive adhesive layer comprising a polybutyl methacrylate or an octadecyl methacrylate-acrylonitrile copolymer is formed on the substrate in the side opposite to the pressure-sensitive adhesive layer; and the waterproofing and airtight pressure-sensitive adhesive tape has an elongation at break under conditions of a distance between two gage marks of 40 mm and a drawing rate of 300 mm/min of from 200 to 1,200% in both the longitudinal direction and the cross direction and a stress under 100% elongation under conditions of a distance between two gage marks of 40 mm and a drawing rate of 50 mm/min of from 10 to 100 N/cm$^2$ in both the longitudinal direction and the cross direction.

* * * * *